United States Patent
Fredriksson

(10) Patent No.: US 7,362,740 B2
(45) Date of Patent: Apr. 22, 2008

(54) ARRANGEMENT WITH A NUMBER OF UNITS THAT CAN COMMUNICATE WITH EACH OTHER VIA A WIRELESS CONNECTION SYSTEM AND A METHOD FOR USE WITH SUCH A SYSTEM

(75) Inventor: Lars-Berno Fredriksson, Kinnahult (SE)

(73) Assignee: Timegalactic AB (SE)

( * ) Notice: Subject to any disclaimer, the term of this patent is extended or adjusted under 35 U.S.C. 154(b) by 814 days.

(21) Appl. No.: 10/363,166

(22) PCT Filed: Aug. 29, 2001

(86) PCT No.: PCT/SE01/01827

§ 371 (c)(1),
(2), (4) Date: Sep. 8, 2003

(87) PCT Pub. No.: WO02/25859

PCT Pub. Date: Mar. 28, 2002

(65) Prior Publication Data

US 2004/0023678 A1    Feb. 5, 2004

(30) Foreign Application Priority Data

Sep. 12, 2000    (SE)    .................................. 0003218
Sep. 12, 2000    (SE)    .................................. 0003219

(51) Int. Cl.
*H04J 3/00*      (2006.01)
*H04J 3/06*      (2006.01)

(52) U.S. Cl. ....................... 370/345; 370/350; 370/503

(58) Field of Classification Search ..................... None
See application file for complete search history.

(56) References Cited

U.S. PATENT DOCUMENTS 3,873,773 A * 3/1975 Guy, Jr. ...................... 370/505
4,506,360 A * 3/1985 Kryskow et al. ........... 370/457

(Continued)

FOREIGN PATENT DOCUMENTS

EP          0748084 A1    12/1996
WO      WO-01/00281 A2    1/2001
WO      WO-01/22754 A1    3/2001

OTHER PUBLICATIONS

Marlin Tomgren; "A Perspective to the Design of Distributed Real-Time Control Applications Based on CAN", 2nd ICC, 1995, Chapter 3 & 4.

(Continued)

*Primary Examiner*—Andrew C. Lee
(74) *Attorney, Agent, or Firm*—Connolly Bove Lodge & Hutz LLP; Myron K. Wyche

(57) ABSTRACT

An arrangement comprises a number of units that can communicate with each other via at least one wireless connection system for the transmission of messages. The connection system works with first and second reception areas. A time slot system is established in a first reception area, in which system the units have access to the transmission media in question in allocated and sequential time intervals, during which the units are activated for their respective transmissions and receptions using time information executed in the time slot system, which time information refers to one or more reference times utilized in the time slot system. The means for effecting the time slot system and the respective unit concerned which is located outside the reception area can receive the said time information signals determining the reference time or reference times, which time information signals are obtained from a master time generation system with the second reception area which is larger or smaller than the first reception area. In this way, the said unit can receive the said time information signal and prepare itself completely or partially for tuning to the said time slot system before it enters into or is covered by the first reception area.

44 Claims, 6 Drawing Sheets

U.S. PATENT DOCUMENTS

Figure 1:
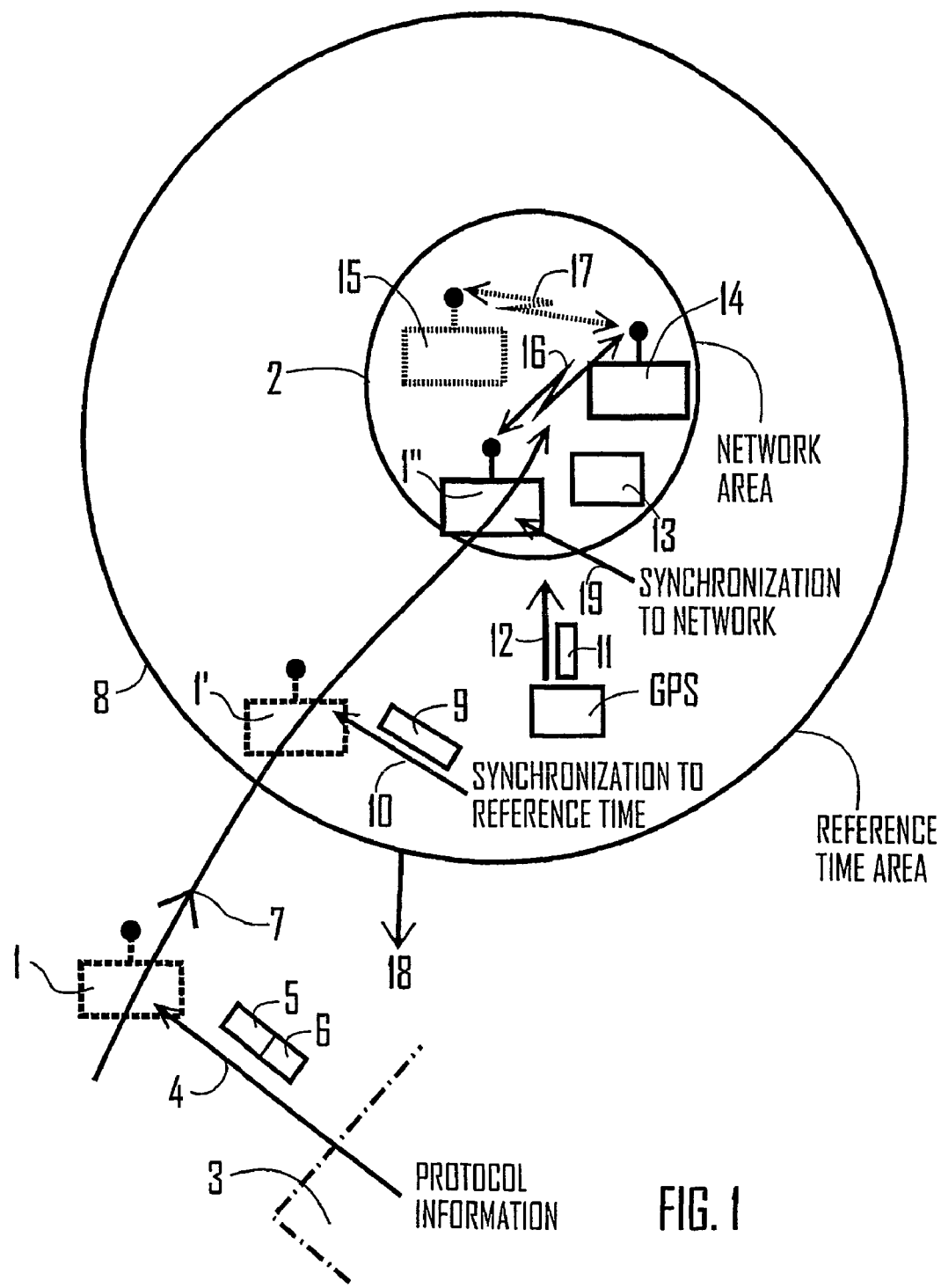

| | | | |
|---|---|---|---|
| 5,367,524 | A | 11/1994 | Rideout, Jr. et al. |
| 5,420,883 | A | 5/1995 | Swensen et al. |
| 5,510,797 | A | 4/1996 | Abraham et al. |
| 5,740,541 | A | 4/1998 | Flippo et al. |
| 5,751,709 | A * | 5/1998 | Rathnavelu ............... 370/395.4 |
| 5,835,861 | A * | 11/1998 | Whiteside ................... 455/466 |
| 5,920,571 | A * | 7/1999 | Houck et al. ............... 370/458 |
| 6,104,341 | A * | 8/2000 | Mita et al. .................. 342/359 |
| 6,339,613 | B2 * | 1/2002 | Terry .......................... 375/227 |
| 6,542,754 | B1 * | 4/2003 | Sayers et al. ............... 455/502 |
| 6,546,249 | B1 * | 4/2003 | Imai et al. .................. 455/436 |
| 6,859,450 | B1 * | 2/2005 | Mansfield ................... 370/344 |
| 7,171,225 | B2 * | 1/2007 | Krasner et al. ............. 455/502 |
| 2001/0022779 | A1 * | 9/2001 | Wheatley et al. ........... 370/252 |
| 2002/0001299 | A1 * | 1/2002 | Petch et al. ................. 370/350 |

OTHER PUBLICATIONS

Horst Wunderlich et al., "Opening Bluetooth for Technical Tasks-Possibilities and Challenges for Automotive Applications",From the Bluetooth Conference in Monte Carlo, Jun. 13-16, 2000, pp. 13, 11, 15-20.

J.A. Fonseca et al., "Using a Planning Scheduler in the CAN Network", Emerging Technologies and Factory Automation, 1999 Proceedings, EFTA, '99, 1999 7th IEEE International Conference on; pp. 815-821 vol. 2; ISBN: 0-7803-5670-5.

Thomas Fuhrer et al., "Time Triggered Communication on CAN (Time Triggered CAN-TTCAN)", In Proceedings of the 7th International CAN conference 2000.

* cited by examiner

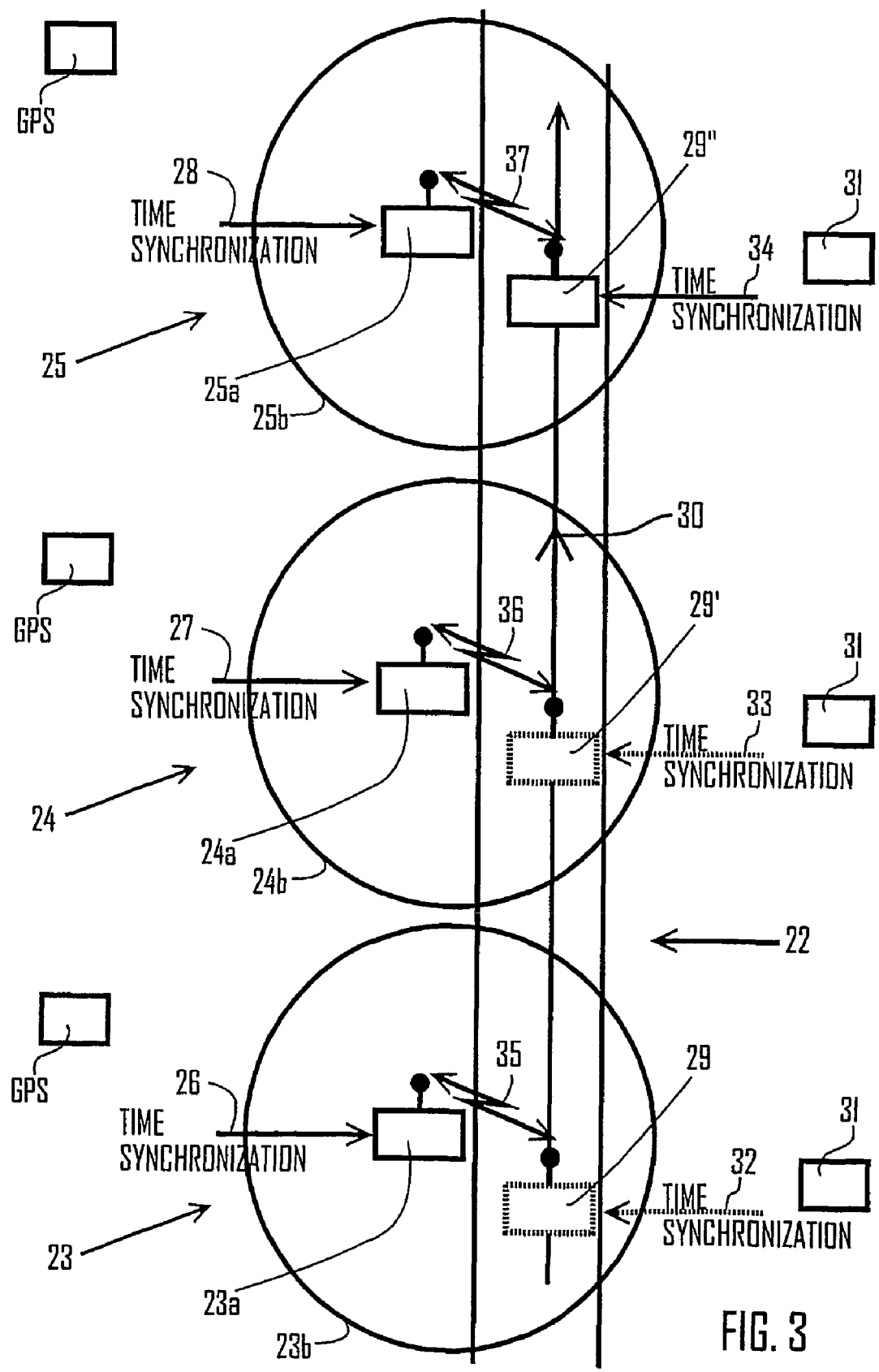

ARRANGEMENT WITH A NUMBER OF UNITS THAT CAN COMMUNICATE WITH EACH OTHER VIA A WIRELESS CONNECTION SYSTEM AND A METHOD FOR USE WITH SUCH A SYSTEM

An arrangement with a number of units that can communicate with each other via a wireless connection system and a method for use with such a system.

The present invention relates among other things to an arrangement for the transmission of messages comprising or operating with a number of units that can communicate with each other via at least one wireless connection system. The connection system can also comprise wired communication which thereby can comprise or be supplemented by optical communication using opto links. The messages can be of various kinds and can, for example, concern control information (commands) and/or data, for example process data. The connection system in question can operate with a varying first reception area and a time slot system established in this by some means (which can be already known), in which time slot system the units have access to the transmission media concerned in allocated and sequential time intervals or time slots. During their intervals, the mobile units are activated for their respective transmissions and receptions by means of time information executed in the time slot system referring to one or more reference times utilized in the time slot system. It is also referred to the preamble of claim 1. The invention also relates to a method associated with this.

The invention can be used in connection with so-called field busses, that is with systems of, for example, the type CAN (Controller Area Network) and CAN Kingdom (developed by the Applicant of the present patent application). The invention also relates to systems that operate with signal protocol in connection with this and radio links, where for example Bluetooth can be mentioned. Reference is made to the literature and patents in connection with the said systems. Reference is made, for example, to the Swedish patent application 000111486 submitted by the same Applicant and to EP 513137 and EP 470199. Reference is also made to the Swedish patent application "An arrangement in a distributed control system for increasing the availability of data and/or control commands" submitted by the same Applicant on the same day. Reference is also made to IEEE 802.11 for the utilization of jumping frequencies or correlation codes (Direct Sequence Spread Spectrum).

In accordance with the invention, a mobile unit must be able to enter a first reception area and connect to existing signal protocol in this, in order to be able to communicate with units that are inside the area. In addition or alternatively, a fixed or mobile unit must be able to be covered by a first reception area which moves in relation to the unit and in a corresponding way must also be able to connect to existing signal protocol in order to make possible communication with other units within the area. A problem associated with this is that with existing systems or signal protocols, for example the Bluetooth protocol, there are long hand-shaking times between entering units and/or covered units and the functions/units already in the system. It can be mentioned in this connection that hand-shaking times can be up to 10 seconds in currently existing systems. The invention intends to solve this problem and proposes arrangements and methods which will reduce to a considerable extent or completely the hand-shaking times in question, which thus means that existing units outside the area can communicate with other units essentially immediately when they enter or end up within the reception area in question.

There are requirements concerning the ability to construct service systems, for example road tolls, service stations, for example in association with petrol stations, garaging arrangements, etc, which make possible rapid or immediate contact between a unit outside the system and the units which are inside the system. The invention is also intended to solve this problem.

In this connection, it can be necessary to obtain verifications or approval of the unit or units in question which are entering or coming inside the system and requesting to communicate with existing units already inside the system. There is also a need to be able to increase the security aspects in connection with the said entering of a unit into or coverage of a unit by the reception area concerned. The invention is also intended to solve this problem.

It is essential that proposed measures can be incorporated in the functions of the systems utilized so that these do not need to be subjected to considerable modification and to be allocated new functions. The invention is intended to solve this problem and proposes a technically simple and also economically advantageous solution in association with systems of the said type.

The principle characteristics of the arrangement according to the invention include i.a. that the arrangement comprises a network area, in which the units exercise their communication in a network, and that the respective unit is adapted to identify and receive information related to a radio protocol including rules for time slots and selection of frequencies in the time slot system and information of a used type of a time reference system, for example GPS, valid for the arrangement. The arrangement also includes an reference time area, which works with the said time reference system and at least one unit is adapted to identify said reference time area and synchronize itself to the reference time by means of said type information. Said at least one unit is adapted to set its own internal clock in dependence of the reference time and to cause a time generating function in the communications between the units within the network area, and the reference time will in such a way be adapted in a separate or independent way from said communications of the units in the network. In an alternative arrangement first units are adapted to establish or be included in two or more geographically separated local networks and the respective local network includes a reference time area. The respective reference time area is then adapted with a time reference system, for example GPS, selected among a number of possible time reference systems. Respective unit of second units comprises or constitutes a mobile unit in a stationary local network or a mobile or stationary unit in a mobile network. Respective unit of the second units is adapted to identify respective reference time area a and to receive information about its valid type of the time reference system. At least one of said second units is adapted to have its internal clock set or actuated by said reference time, which in such a way is adapted to be separated from or independent of the communications of the units in respective network.

At its connection procedure to the arrangement respective unit is bodily inside or outside said network area and/or said time reference area. Then the unit is adapted to work with a first stage for connection to the actual radio protocol, a second stage for entrance into or identification of the referens time area, and a third stage in which the time generating function is performed between the internal clocks of the units. By means of the time generating function, the units are adapted to assume actuated positions or conditions for transmission and reception of their messages and to assume not actuated positions or conditions in the case without any transmission or reception. A schema or time schedule for the appearance of the time slots in the time slot system is adapted to attain allotment of the time slots to the units in connection with the actuated positions or conditions of the units in order to make it possible to allot the units to their time slots without any essential time related data in the transmitted or received messages. The unit or the units, the clock or clocks of which is or are, respectively, set or influenced by the reference time, can in its or their turn operate or operates as time master or time masters to that unit or those units of the actual units which do not have been set or influenced by the reference time.

In an embodiment an arrangement according to the invention can be considered to be, among other things, that both the means for implementing the time slot system and the unit concerned which is located outside the reception area can receive time information signals determining the reference time or times in question obtained from a master time generation system, which can consist of, for example, the GPS system (Global Positioning System) which has a second reception area that can be larger or smaller in area than the first reception area. The said unit is thereby arranged, upon receipt of the said time information signal, to prepare itself completely or partially for tuning to the said time slot system before it enters into or is covered by the first reception area.

Thus the said reference time or times can be considered to emanate secondarily from master time generation which is arranged within a second reception area which thereby can be situated inside the first reception area. A unit which is located or which ends up outside the first reception area (due to variation and/or movement of the first reception area and/or movement of the unit) obtains the reference time indication in the first reception area when the first reception area covers the unit or when it enters into the first reception area. Updating and maintaining of accuracy of the first reception area's reference time or times can be carried out by one or more units entering, being covered by or being located in the second reception area at least temporarily for a predetermined minimum time interval and obtaining transformable updated reference time or times for other mobile units in the first reception area.

The invention can thus be considered to comprise or consist of a system that establishes a common global time-keeping for a system. Each node can thereby have its local time which is either synchronized to or related to the global time. A schedule with time slots referring to the global time for transmission and reception of messages is drawn up for all the nodes in the system. The time slots that are allocated to the messages that the node is to transmit or receive can thereby be distributed to each node in such a way that sender and destination or destinations of the majority of messages can be determined just from knowledge of the system's schedule, the common global time-keeping and the time slot in which the message is sent.

In a further embodiment of the arrangement according to the invention can be considered to be, among other things, that the first units are arranged to form two or more geographically separated local networks which operate with essentially the same signal protocol and that the local networks also operate with the same time synchronization and reference times which can be determined from a master time generation system, which can consist of the GPS system or other established system. The respective second unit, that consists of a mobile unit in the case of a fixed local network or of a mobile or fixed unit in the case of a mobile local network, is arranged to receive time control from the master time generation system when it is in a position outside the reception area of the respective local networks and to utilize the received time control to prepare itself completely or partially for tuning to the said time slot system before it enters into or is covered by the said reception area.

Further developments of the invention will be apparent from the subsidiary claims concerning the arrangement described above.

The principle characteristics of a connection method according to the invention can be considered to be, among other things, that a given signal protocol for the system is obtained by the mobile unit in question which is to enter or be covered by the reception area concerned. Synchronization of the unit to the system's global time is effected. If allocated time slots are thereby obtained already upon the obtaining of the said signal protocol, transmission/reception in accordance with the protocol can commence directly or immediately. If, however, the allocated time slots in question are not obtained, the time slots can be obtained according to rules which are to be found in the signal protocol above, after which transmission/reception according to the protocol can then commence.

Further developments of the method in question are apparent from the following subsidiary claims concerning the method.

The system can comprise different types of connections, wireless links and wired links. Wired links also include optical connections via opto links. The transmission of messages can take place in different steps, for example, in two steps from wireless transmitter to wireless receiver and from wireless receiver to wired link. Alternatively, three steps can be used, namely from wired link to wireless transmitter(s), from wireless transmitter to wireless receivers per channel and from wireless receivers to wired link.

The wireless transmitters each transmit on their own "channel" (frequency channel). A channel is characterized in that, when transmitting, each transmitter has access to a part of the available bandwidth in the ether which is exclusive to the system. The exclusivity can be an allocated frequency in a time interval, for example as in the known Bluetooth protocol or IEEE 802.11 for jumping frequency or a correlation code as in IEEE 802.11 Direct Sequence Spread Spectrum. A transmitter and one or more receivers can operate on one and the same channel during one and the same time interval.

Nodes can be connected both to the wireless network and to the wired network and are called g-nodes. They act as "gateways", that is they receive a complete message on the wireless link and ascertain in a known way that it has been correctly received, by means of check codes, error-correction codes, etc. Thereafter the message is transmitted on the wired link. Each message has an identity on the respective medium which is at least unique for that transmission occasion. The identity can be a bit code or can consist of a particular time slot in a scheduled system or a combination of these methods. The identity can be common or different for the two media. If they are different, the association between the identities is known by the respective g-node (see below). Such an association can be made in a plurality of ways, some of which are described in the patent referred to.

The Bluetooth protocol can be modified so that several slaves are allocated the same time slot for reception. A CAN message (here an LLC data frame) is generated in a PC equipped with a radio interface of the Bluetooth type. The CAN message is packaged as data in a Bluetooth message which is sent by the PC and received by two or more g-nodes. The g-nodes that have received the CAN message error-free according to the Bluetooth protocol's error-detection mechanisms thereafter send out the CAN message on the CAN bus. If several g-nodes commence their transmission synchronized to the same Strat of Frame (SOF), they will simultaneously send the message bit by bit, which will work because the messages are identical. If any g-node or g-nodes can not synchronize to the message that the first g-node sends, then they change over into receiving nodes in accordance with the CAN protocol. They will then receive a message that is identical to the one they were in the process of sending. When they have ascertained that such is the case, they refrain from sending their message. There is thus parallel redundancy for signalling from the PC to the CAN network. In the opposite direction, serial redundancy can be achieved. Each g-node is allocated a time slot for transmission and information about which CAN identifier identifies the CAN messages that are to be sent to the PC. At the same time, they obtain the messages on the CAN bus in accordance with the CAN protocol. The messages that are to be sent to the PC are packaged as data in a Bluetooth message that is sent in the respective time slot. The PC then receives one or more identical messages from the CAN system. This method is here designated "P-presentation".

Figure 5:
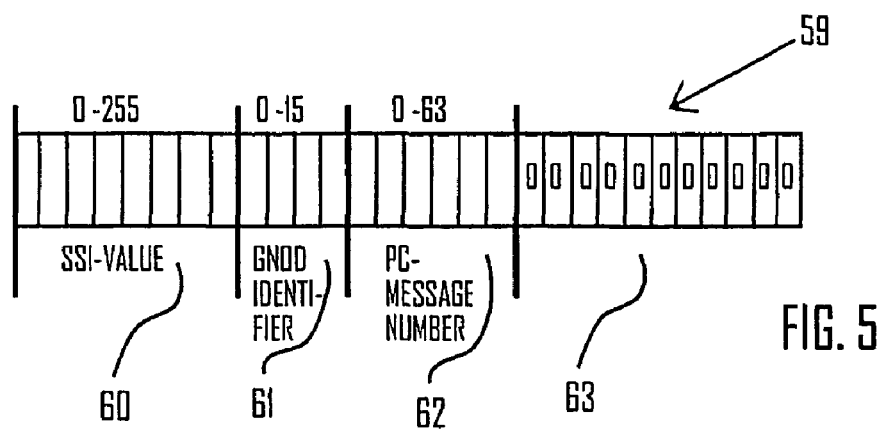

If information is required about which recipient has received the strongest signal, the following procedure can be applied. It assumes that the radio part of the g-nodes provides a value for the signal strength, (signal strength indicator, SSI), for example a measurement value 0-255. The CAN identifier is then divided into at least three fields (see FIG. 5 below). One which contains the value 255—the SSI value, one which indicates which g-node is sending the message and one which indicates that it is one (of several) messages from the PC. If now the SSI value—255 is inserted first in the CAN identifier, the g-node that has the highest signal strength will gain access to the bus if all the g-nodes commence signalling simultaneously. The information about which g-node has the strongest signal and the actual value of this is thus to be found in the CAN identifier and is thus available to all nodes that can use this information. FIG. 5 shows an example of organisation of CAN identifiers by signal strength, the identity of up to 16 g-nodes and the identity of up to 64 messages from the PC. More information about how CAN identifiers can be constructed to give the required characteristics is to be found in the specification for CAN-Kingdom. This method is called "SSI-presentation".

According to the invention, a mobile transmitter can be used. In the first position it has contact with two receivers, then three, thereafter two. Maximal transmission reliability is ensured in a simple way by means of P-presentation. Using SSI-presentation, it is also possible to obtain a good idea of where the mobile transmitter is located. Examples of combinations of a mobile transmitter and a fixed network can be a car in a garage, a car at a service station, an ignition key (or corresponding item that can comprise a similar function, for example a mobile phone, identity card, etc,) for a vehicle/car/tractor/excavator/etc. Signal strength indication can be used in association with indication of bit errors. In the event of a so-called multipath situation (several signal paths), messages with errors can be obtained, in spite of the signal strength being high. The messages with errors can be detected by the error-detection mechanism in the protocol as bit errors in the message. If the error persists, the conclusion can be drawn that there is a multipath situation and measures can be implemented in the form of a change of transmitter, transmitter position, amendment of propagation diagram, etc. This also ensures that the approval by the different networks of the different entering units or covered units is technically simple.

Figure 2:
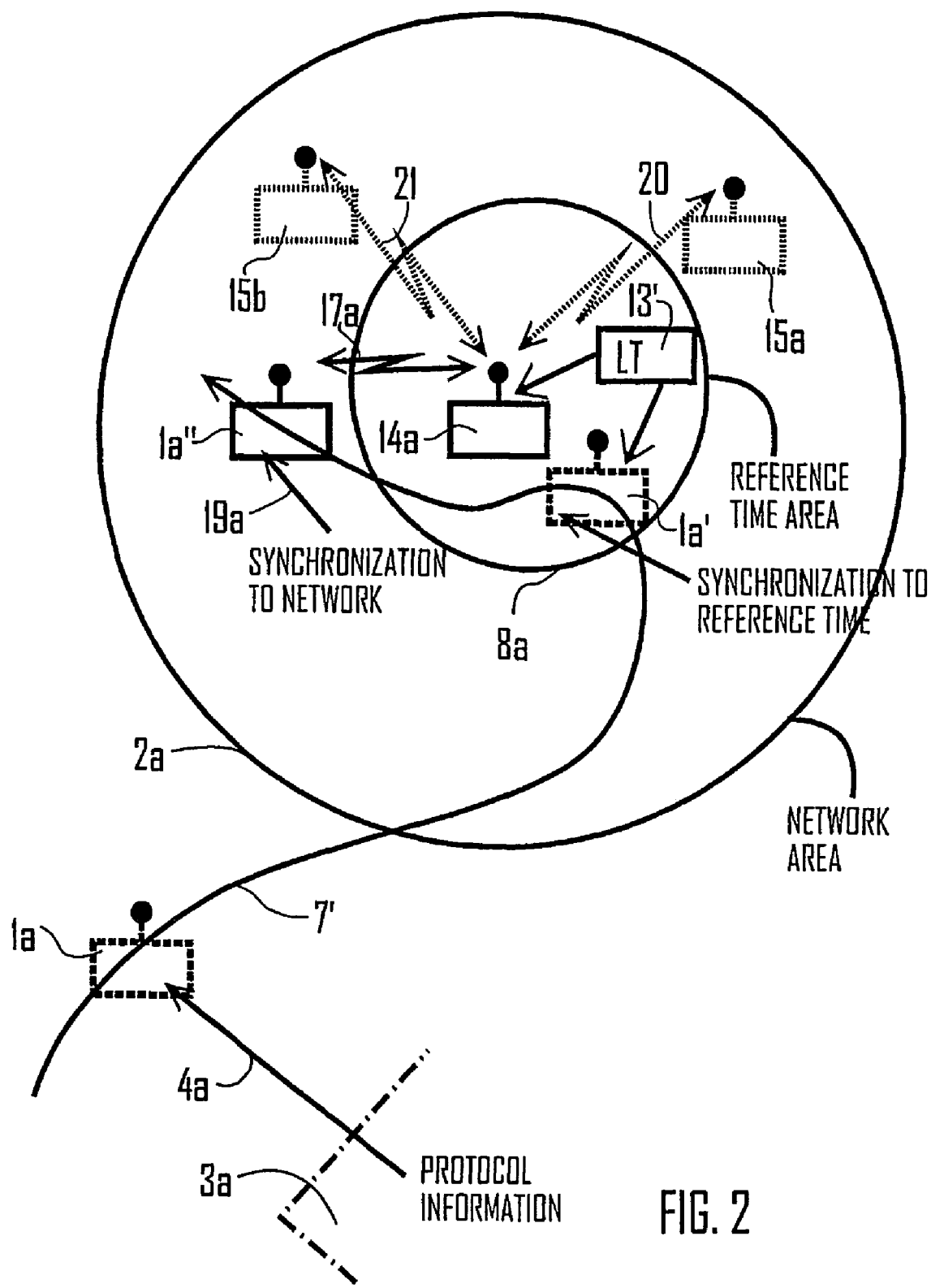
Figure 3A:
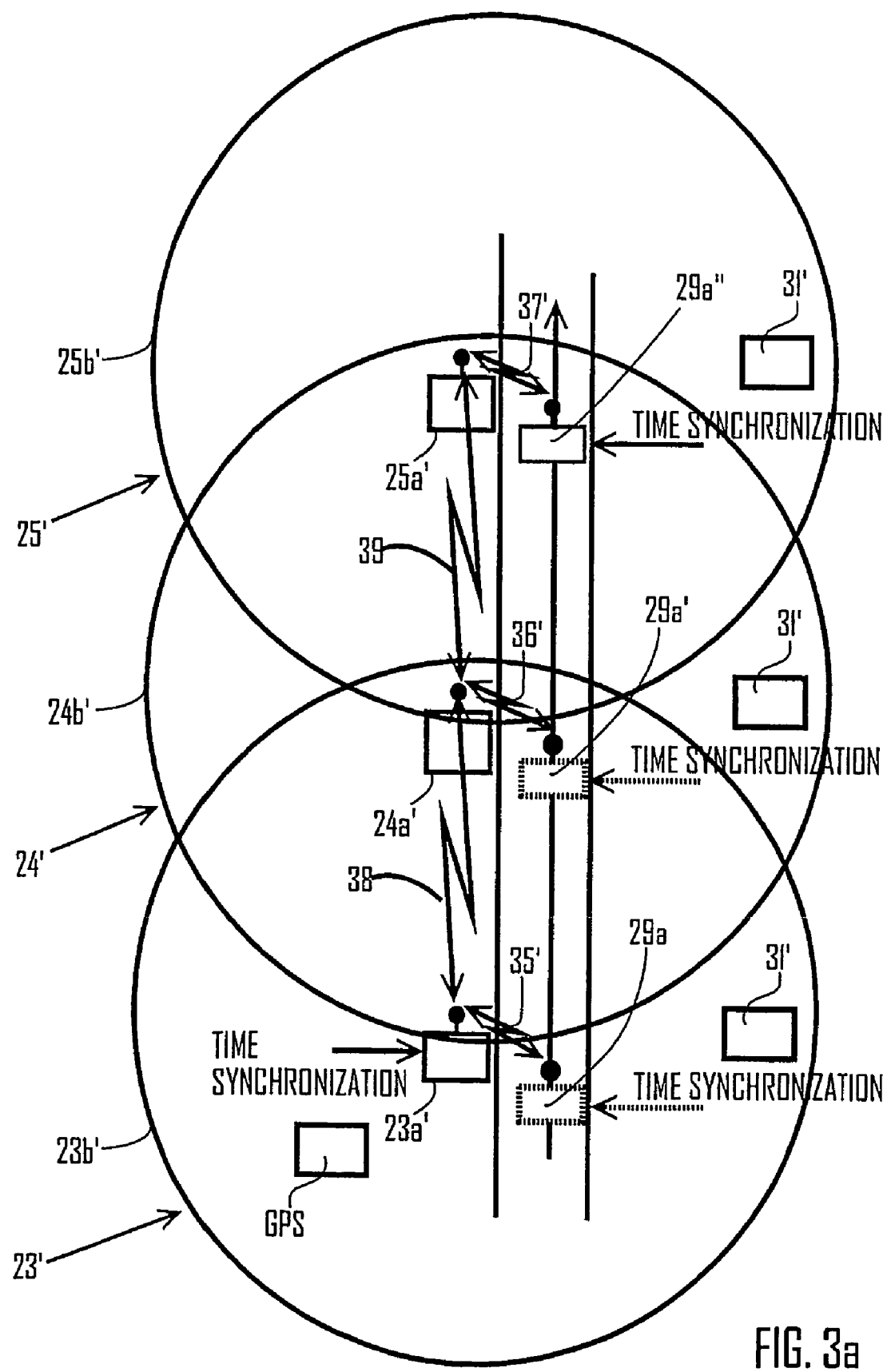
Figure 4:
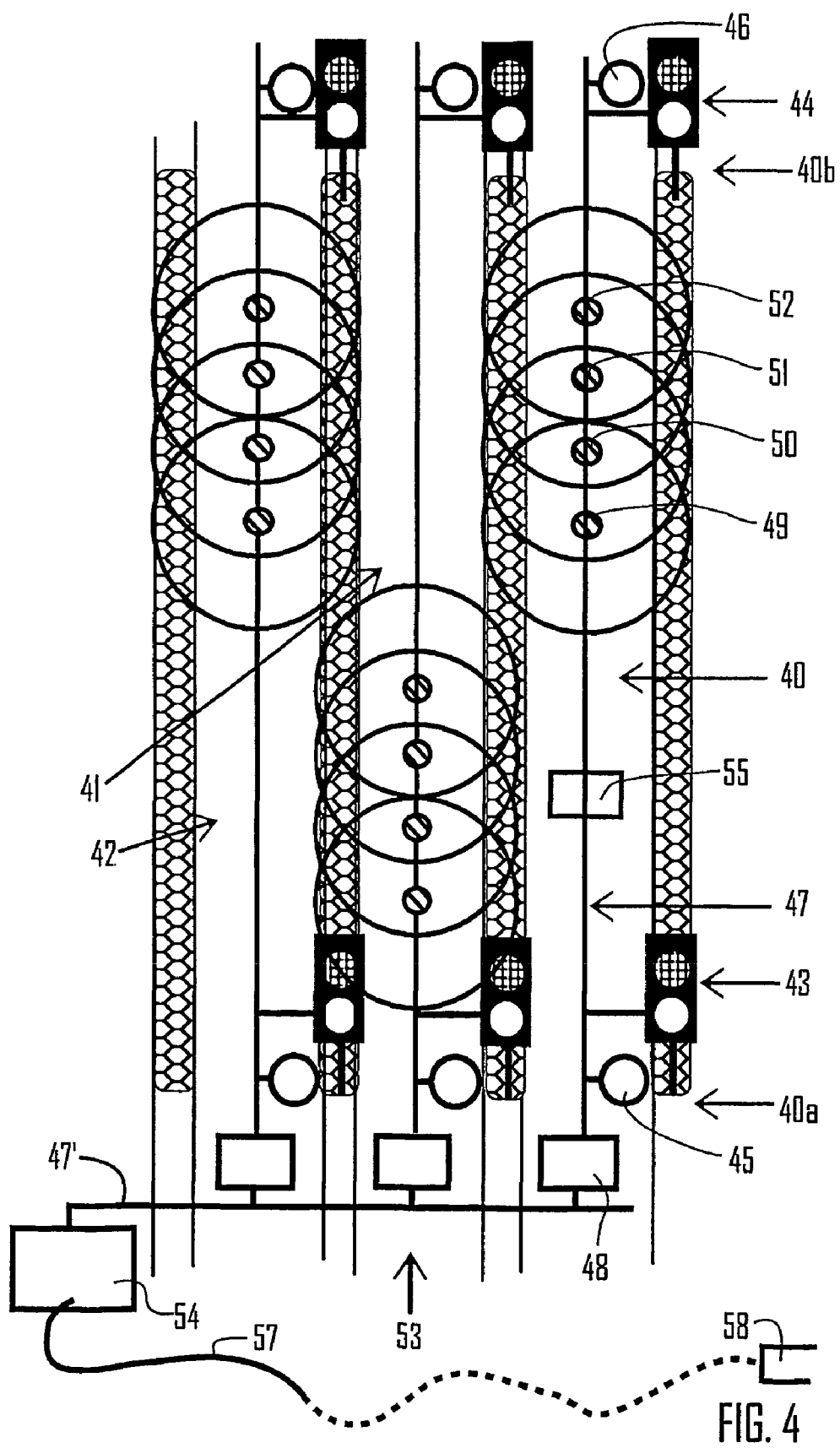
Figure 6:
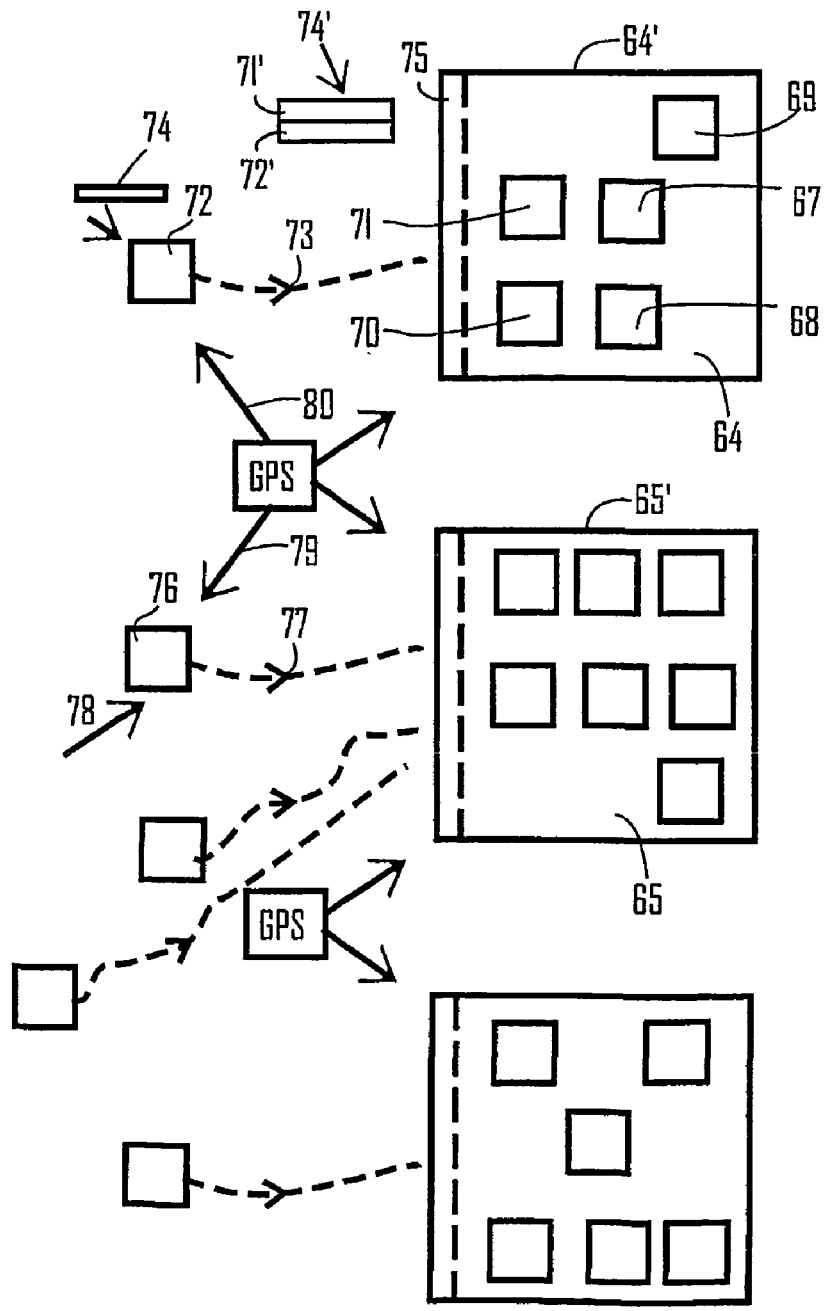

A currently proposed embodiment of an arrangement and a method according to the invention will be described below with reference to the attached figures in which FIG. 1 shows in diagrammatic form and in a horizontal view, first and second reception areas where nodes are located inside the areas and where a node which is located outside the nodes is in the process of entering or being covered by the system or the networks, FIG. 2 shows in diagrammatic form and in a horizontal view, a second embodiment of the network and reference system, FIG. 3 shows in diagrammatic form and in a horizontal view, how a vehicle on a road interacts with advertising boards or the like arranged along the road, FIG. 3a shows in diagrammatic form and in a horizontal view, a different embodiment in relation to FIG. 3, FIG. 4 shows in diagrammatic form and in a horizontal view, a road toll system, FIG. 5 shows in diagrammatic form, an example of the construction of a type of message, and FIG. 6 shows in diagrammatic form and in a horizontal view, an embodiment with local networks in the form of petrol stations and mobile units in the form of customers and staff at the petrol stations.

With the Bluetooth system (Bluetooth protocol) it can take a long time for a unit entering into a pico-network to synchronize itself to the network in question. This problem can be solved by a modification of the Bluetooth protocol combined with GPS and certain prior information. The arrangement and/or the method can be used by all vehicles with navigation systems based on accurate time, for example GPS, which transmit a very accurate time indication once per second. Based on a radio system of the Bluetooth type, this operates with symmetrical time slots where each time slot is 2.5 ms. The system jumps between five frequencies, A, B, C, D and E. For the sake of simplicity, it is assumed that the frequencies are taken in turn. The stationary unit commences the time slot with the time to with the frequency A for transmission, t+2.5 ms A for reception, t+5 ms B for transmission, t+7.5 ms B for reception, and so on. By knowing the time t and the algorithm for time slots for transmission and reception and for frequency jumping, any mobile node can be pre-synchronized to a fixed system. It is easily recognized that more complex algorithms and sequences can be used for synchronization of mobile units entering fixed systems. Once the mobile node has been incorporated in the fixed system, there is no longer the need for the mobile node to be able to be directly synchronized to the reference time system. It is sufficient for it to be synchronized to the fixed network, which in turn is synchronized to the reference time system. The main idea is that the fixed system has a previously determined behaviour in relation to the time in a reference time base. As this reference time base has a larger geographical extent than the fixed system, a mobile node can synchronize itself to the system as soon as it can synchronize itself to the time in the reference time system. This concept can be extended to completely virtual systems, where nodes programmed to be able to operate in a particular system do so when they come within range of other nodes which are programmed for the same system. Here it can of course be assumed that the individual nodes have a larger geographical extent than the reference time system. It is then the geographical area of the reference time system that limits the ability of the mobile nodes to synchronize themselves to the system.

A salient feature of the invention can be that a time master according to a known system has been separated from other protocol problems. Other functions can be solved in the usual way and the solutions found can be communicated to the nodes that are to interact. The reference time base can be GPS, but there are many other alternatives.

Using the invention, it is simple to construct service systems, for example, road tolls, service stations, garages, etc. As the local networks are small geographically and well separated from each other, all can work in a synchronized way. All the service stations of a petrol company can have the same protocol for frequency jumping, time slots, etc, and can work synchronized in time. Upon signing an agreement, the company's customers can receive the necessary information about the protocol and can thus be phased in to the network immediately when visiting any service stations belonging to the company. The information required can be distributed in many ways, for example via the Internet.

In one embodiment, a unit that is not yet connected can listen on a fixed frequency where it knows that time messages can appear. These can, in addition to the time, also contain a heading which identifies the system. In this way, the unit that is not yet connected can synchronize itself to the network on the messages that are sent in order to maintain the global time in the system.

FIG. 1 shows how a movable or mobile unit 1 is about to enter a first reception area 2 which can consist of a network area. In the position shown in FIG. 1 outside the network area, the mobile unit obtains information about the signal protocol which exists or is utilized within the area 2. The signal protocol information can be obtained in various known ways. In a first alternative, the mobile unit can have internal selection options for selecting different signal protocols. Alternatively, the protocol information can be transmitted from a unit 3 via a connection 4. The connection can, for example, consist of a radio frequency link and in FIG. 1 a message is indicated by 5, by means of which message the information of i.a. the type of reference time is transferred. The mobile unit moves in a direction indicated by 7 towards the network area in question. In this case, the system operates with a reference time area or another reception area 8 which is larger in size than the area 2. At the position of the mobile unit 1 within the reference time area, which position is indicated by 1' and broken lines, the unit can synchronize itself to the time of the reference time base. This synchronization can be carried out in a known way in accordance with the above. The direction of the message transmission from the master time generation system concerned is indicated by 10. In this embodiment, the time generation system consists of the GPS system, which has been symbolized in FIG. 1 by GPS. The network system 2 also knows about the time generation in question from the master time generation system. In FIG. 1, the transmission from the GPS system is symbolized by the message 11 which is transmitted in a direction 12 towards the network system. In the network system there are means 13 for synchronization functions. The said means 13 are only indicated symbolically and can be arranged in a known way overall in a base station and/or arranged in or at one or more units 14, 15 which can be fixed and/or mobile. When it enters into the network system 2, the mobile unit has thus all the necessary information it requires in order to be able to operate within the network 2. When the mobile unit 1' is located within the area 2, traffic can already pass between fixed and/or mobile units 14, 15 within this area and the unit which has now entered or which has just entered can communicate immediately with other units without hand-shaking procedures needing to be implemented with these. Thus the unit 1, 1', 1" prepares itself for tuning to the time system and time slot system before entering into the area 2, which thus makes the hand-shaking procedure unnecessary upon the actual entry into the area 2. In this case, the different units within the area 2 communicate via radio links which are symbolized by 16 and 17. The units are equipped with transmitter, receiver, antenna and other equipment in a known way. In this case, a mobile unit 1 has been described which moves relative to the areas 2 and 8 in question. Alternatively, one or both of the said areas can move relative to the unit 1, which can then be fixed or mobile. In this case, the direction of movement of the respective network is indicated by 18.

In accordance with FIG. 2, the reference time area 8*a* can have a smaller extent than the network area 2*a*, that is the first reception area 2*a* has a larger extent than the second reception area 8*a*. As in the previous case, the mobile node 1*a* obtains the requisite protocol information outside the time reference and network areas. The protocol information can be derived in a corresponding way to the case shown in FIG. 1, for example internally in the mobile unit 1*a* or from an external unit or an external system 3*a*. In this case, the direction is indicated by 4*a*. The unit 1*a* enters the network area 2*a*, but can not synchronize itself to this as the unit is not synchronized to the reference time system. Once inside the reference time area, that is in the position shown by 1*a'*, the unit can synchronize itself to the reference time and when this has taken place, the unit can derive the correct frequencies and time slots according to the radio signal protocol utilized and thereby connect to the network area 2*a* using other protocol information. Once synchronized to the network 2*a*, it can leave the reference time area and in accordance with the system utilized (CAN, CAN KINGDOM, Bluetooth, etc) it is sufficient for the unit or units that are inside the reference time area to be synchronized to the reference time. The units connected to the network outside the reference time area can maintain the synchronization by using the time slots of the units synchronized to the reference time as a secondary reference indicator. Any one unit, for example 14*a*, in the network must, however, return inside the reference time area for re-synchronization before the time slots in the system fall outside an acceptable tolerance level. The unit 1*a* can thus leave its position 1*a'* and assume a position 1 an outside the reference time area 8*a* and establish communication with other units 14*a*, 15*a*, 15*b*. Also in this case, a time generation system in the form of GPS can be utilized. In FIG. 2, the synchronization function is indicated or symbolized by 9*a*. The synchronization function for the network which is indicated by 19 in FIG. 1 has been symbolized by 19*a* in FIG. 2. In FIG. 2, the radio links between the different units are indicated or symbolized by 17*a*, 20 and 21, which links are thus established using channel frequencies in a known way.

FIG. 3 shows an example of the use of the invention along a road or a section of road 22. Means for emitting information and/or receiving information are arranged at a distance from each other along the road. In the present case, the means consist of a number of advertising boards 23, 24, 25 which comprise fixed nodes 23*a*, 24*a*, 25*a* with radio transmitters and/or radio receivers in accordance with the above. The respective transmitters/receivers have reception areas 23*b*, 24*b*, 25*b*, which reception areas do not overlap, for which reason they can all have the same frequency jumping and time slots and can work in a synchronized way.

Each has access to the reference time system, which can here advantageously consist of the GPS system. The time synchronization system for the fixed units is symbolized by 26, 27 and 28 respectively. A car 29 moves along the section of road 22 in a direction 30 and in FIG. 3 the car's positions in the different areas 23b, 24b and 25b are indicated by 29, 29' and 29" respectively. The car or vehicle is synchronized to the reference time system 31, which synchronization is symbolized by arrows 32, 33, 34. When passing the advertising boards 23, 24, 25, the car 29 can receive messages from the advertising boards in its different positions. The contact can be two-way and information from the car can thus also be transmitted to the advertising boards. The coverage area for an advertising board can typically be 30 metres along the road, which provides approximately 1 second of effective contact with the car if the car is travelling at 100 km/hour. The messages between the car and the advertising boards are exchanged in accordance with the utilized signal protocol. In one embodiment, the messages from an advertising board can be one-way and can be sent as one packet per time slot, where each packet is numbered, for example from 0 to 64, and sent in a continually circular sequence. In the car they can later be displayed in the order 0 to 64, regardless of where in the sequence the reception commenced. In FIG. 3, the radio links (the channel frequencies) are symbolized by 35, 36 and 37.

A more advanced example is shown in FIG. 3a, where coverage areas 23b', 24b', 25b' of the advertising boards 23', 24', 25' respectively are partly overlapping. Also in this case, the advertising boards or the like comprise fixed nodes or radio transmitters/receivers 23a', 24a' and 25a' respectively. The advertising boards 23', 24' and 25' interact in accordance with FIG. 3a in a common network and the time slots must be divided between them, as, for example, the unit 24a' is covered by both the areas 23b' and 25b'. Only one unit, for example the unit 23a', needs to have been synchronized to the reference time system which also in this case can consist of GPS. Other units can synchronize on the time slots in the network and this network synchronization is symbolized by 31'. If the network is enlarged by a fourth unit, for example after the unit 3, this fourth unit can reuse the frequency and time schedule, etc, of the unit 23a'. In FIG. 3a, the radio links between the car and the respective advertising boards at the different positions of the car are indicated by 35', 36' and 37' respectively. In this case, there are also radio links between the units 23a', 24a' and 25a', which radio links are symbolized by 38 and 39.

In accordance with FIG. 4, the invention can be used in connection with road tolls or the like. A number of lanes, for example, parallel lanes 40, 41 and 42, are arranged or created. Each lane, for example lane 40, is provided with traffic lights, for example two sets of traffic lights, 43, 44, one at the entrance 40a and one at the exit 40b of the respective lane. At the entrance and exit, 40a and 40b, are arranged sensors, 45 and 46 respectively, which sensors are arranged to detect the passing of a vehicle or car. In addition, the respective lane has a local wired network 47 which is connected to a lane controller 48, to the traffic lights 43, 44 and to a number of radio units 49, 50, 51, 52 which are sequentially overlapping. The lane controllers in the different lanes are in turn connected to a wired network 47', which is connected to the charging system 58 belonging to the owner of the road via a road toll unit. When there is no car in the lane, the light arrangement 43 at the entrance 40a shows green and the light arrangement 44 at the exit shows red. When a car 55 driving in the direction 56 passes the sensor 45, the light system 43 changes to red. The car 55 then passes the radio units 49, 50, 51, 52 which work in a synchronized way. While it passes, requisite information is exchanged, for example such information that enables the road toll in question to be able to be charged. When the exchange of information has been effected, the exit light or exit light arrangement changes to green. When the car passes the exit sensor 46, the lane returns to its original status. By several radio units working in a synchronized way, a redundant connection is achieved to the passing car with good range in the longitudinal direction of the road, but with a limited range in the transverse direction. The propagation diagram, can, in accordance with the above, be further Improved by the use of directional antennas. In the figure, the radio units have been grouped in order to minimize crosstalk and message packet collisions between the lanes. In an alternative embodiment, the time slots can be coordinated, so that crosstalk or message packet collisions are avoided or do not occur. In accordance with FIG. 4, the fixed radio units 49, 50, 51, 52 are displaced along the longitudinal direction of the lanes, whereby in the case shown the radio units in the central lane are located closer to the entrances 40a of the lanes than the fixed units of the outer lanes which are located closer to the exits 40b of the lanes. In this way, the distance between the reception areas can be increased and the danger of crosstalk or message packet collisions is avoided. In FIG. 4, a wired link is indicated by 57, which can lead from the unit 54 to a charging system 58 at a distance from the lanes in question. The unit 54 can thereby act as an adaptation unit between the fixed network and the charging system. Alternatively, the link 57 can consist of a different type of connection, for example a wireless link.

The advantage of, for example, using phase-displaced layouts is obvious. One category of mobile unit can thereby follow a first schedule and another category can have a second schedule. Radio apparatus involved can transmit simultaneously and frequency jumping can be effected at the same time, which frequency jumping can thereby still be carried out at random. The time base is shared and known and a reference system is used. The invention is thus based on distributed scheduling and can be made orthogonally independent. The system can separate time or frequency and a utilized time slot or slots can be divided up and the transmission can be directed. The transmission can thereby be directed towards a car or a vehicle in such a way that it does not reach a car or vehicle that is adjacent or close by. When detection of the signal strength is required, it is not sufficient in all cases in accordance with the above to detect only the signal strength (cf. multipath). It is a case of ascertaining where there is a reflection and of changing the car or vehicle's antenna propagation and/or direction. Error-detection codes can thereby be used, and the call direction can be changed, the unit position can be changed, etc. To carry out the functions described above, there is thus an original basic system on which is based the definition of new schedules, jump algorithms, etc. Interpretation can be carried out of information in each time slot with regard to which frequency is to be used in the slots, the jump schedule, algorithms, etc, outputs, choice of antenna, dispersion area, etc. By means of the proposals above, the system is not dependent upon working with a beacon signal to which it must be related. With such a beacon signal, the risk of interference is considerable and in the case where this signal is absent, the whole system is reset, which is not the case with the system/network according to the invention.

FIG. 5 shows an example of a construction of a message type in accordance with the above, with reference to what was discussed above. In FIG. 5, the message is indicated by 59 and comprises a first part 60 that consists of an SSI value, a part 61 that consists of a g-node identifier, a part 62 that indicates the PC message number and a part 63 with additional data.

FIG. 6 shows a concrete example of the present invention based (completely or partially) on the principles, functions and/or constructions described above. FIG. 6 shows three local networks 64, 65 and 66, for example in the form of petrol stations. The stations are separated geographically in a known way and operate with essentially the same signal protocol, see above. The local networks also operate with the same time synchronizations and reference times that can be determined from a master time generation system which can consist of the so-called GPS system, see also the example described above. The local networks comprise first units, for example, the units 67 and 68. These units can be fixed and can communicate with each other via connections that can consist of fixed connections, radio links, etc, not shown specially in FIG. 6, see also above. The local networks also work with mobile or fixed second units, which are represented by 69, 70, 71 in FIG. 6. These second units can be divided into different categories, the unit 69 representing a category that comprises staff and the units 70 and 71 comprising or representing mobile customers of the local network in question. The customers are to be served by the local network or the petrol station in accordance with the above. The respective local network can be entered by mobile units which are outside the reference area of the local network, see above. In FIG. 6, a mobile unit/customer 72 is about to enter the local network 64, note the direction 73. In accordance with the above, the mobile unit 72 obtains information about the existing signal protocol in the network 64. In FIG. 6, this receipt of information is symbolized by 74, 75. The local network 64 also operates with a function for approval of the mobile unit 72 before this is connected by the protocol and the reference times in the network 64. In a corresponding way, the mobile unit 76 can enter the network 65 in the direction 77. Prior to entry into, or approval by, the network, etc, the mobile units obtain reference time information from the master time generation system, for example the GPS system. In FIG. 6, this transmission of information is symbolized by 79 and 80. The respective mobile units 72, 76 (which can consist of customers/staff) thus receive time control from the master time generation system while in a position outside the reception area 64', 65' of the respective local network and utilize the received time control 79, 78 in order to prepare themselves completely or partially for their tuning to the time slot system used in the respective local network before they enter into the said reception area. The respective local network can thereby operate with a time slot system where the schedules are phase-displaced in frequency or time in each time slot and the channel frequencies thus obtained in the respective time slots are allocated to the different categories (customer/staff). The customers can in turn be divided into different categories. A first channel frequency can be allocated to the local network's customers and a second channel frequency can be allocated to the local network's staff, and in a similar way different categories of customer can have different channel frequencies. In accordance with the invention, the algorithms for channel frequency jumping can be constructed in such a way that the different channel frequencies in the respective time slots jump at random simultaneously and equally. Thus the arrangement also operates here with distributed scheduling and separation of different categories (customers/staff). The separation is carried out in time and/or frequency and the transmissions in the mobile and any fixed radio apparatus (transmitter/receiver) can operate with directed transmissions so that, for example, customer apparatus in close proximity to other customer apparatus will not be subject to interference. Detection of the signal strength can be utilized in the error-detection function and in certain cases, particularly in the event of a multipath situation, the error-detection code in the signal protocol, changing of the antenna propagation and/or antenna direction are also used. In FIG. 6, a time slot is shown symbolically by 74'. The time slot in question is divided into two parts, one representing a first channel frequency 71' and the second representing a second channel frequency 72', which first and second channel frequencies can thus be allocated to two different categories in the context concerned.

Said time generating function, which relates to the internal clocks of the unit, can operate in a way known in itself, compare the above mentioned prior art, the system CANKINGDOM provided on the market by KVASER AB/SE, etc. There is no need for the time reference system to be involved or dependent with the network or protocol. The time reference system can for example supplementary be used for other operations in the system than setting said clock or clocks of the units. By said independence of the reference time it is not possible to use the beacon signals, which have to be initiated in the right way all the time in order to prevent disturbances in the communications of the units. Only the type information 6 is necessary in the present case for indication of the type of reference time used in the case. The global time of the system can be seen as separate from the protocol (network). The actual time is put in relation to the time schedule.

The invention is not limited to the embodiment described above by way of example, but can be modified within the scope of the following claims and invention concept.

The invention claimed is:

1. An arrangement with a number of mobile units that can communicate with each other via a wireless connection system for transmission of messages which comprise control information and/or data, wherein the mobile units have access to an actual transmission medium in sequential time intervals, at the intervals where the units are actuated for their respective transmissions and receptions by means of a time slot system, the arrangement comprising:

a time reference system;

an algorithm for time slots for transmission, reception and frequency jumping;

the mobile units are pre-synchronized to a respective reference time area of respective local networks before entering the respective local networks and synchronized across at least two geographically separated local networks;

and at least one of the following:

a) in that the arrangement comprises a network area in which the mobile units exercise their communication in a network, in that the respective mobile units are adapted to identify and receive information related to a radio protocol including rules for the time slots and selection of frequencies in the time slot system and type information on the time reference system that is valid for the arrangement, in that the arrangement also includes a reference time area, which works with said time reference system, in that at least one mobile unit is adapted to identify said reference time area and synchronize itself to a reference time by means of said type information, in that said at least one mobile unit is adapted to set its own internal clock in dependence on the reference time and to cause a time generating function in the communications between the mobile units within the local network area, and in that the reference time is adapted to be separated or independent from said communications of the mobile units in the local network; and/or b) in that first mobile units are included in at least two geographically separated local networks, in that the respective local network includes reference time area, in that the respective reference time area is adapted with a time reference system selected from among a number of possible time reference systems, in that a respective mobile unit of second mobile units comprises or constitutes a mobile unit in a stationary local network or at least one of a mobile unit and a stationary unit in a mobile network, in that the respective mobile unit of the second mobile units is adapted to identify respective reference time area and receive type information about the time reference system, and in that at least one of said second mobile units is adapted to have its internal clock at least one of set or actuated by said reference time and is adapted to be separated from or independent of the communications of the mobile units in respective networks.

2. Arrangement according to claim 1, characterized in that the respective unit at its connection procedure to the arrangement is bodily inside or outside said network area and/or said time reference area and is adapted to work with a first stage for connection to the actual radio protocol, a second stage for entrance into or identification of the reference time area, and a third stage in which the time generating function is performed between the internal clocks of the units.

3. Arrangement according to claim 2, characterized in that the unit or the units, the clock or clocks of which is or are, respectively, set or influenced by the reference time, in its or their turn operate or operates as time master or time masters to that unit or those units of the actual units which have not been set or influenced by the reference time.

4. An arrangement according to claim 3, characterized in that the units are mobile and can end up outside the first reception area due to variations and or movements of this and/or movements of the unit, that is in the case of mobile units, in that the first reception area is considerably larger than the second reception area and in that the respective (mobile) units prepare themselves completely or partially before entry or re-entry into the first reception area.

5. An arrangement according to claim 4, characterized in that in the case where the mobile unit's current setting gives a sequence of time slots which coincides with the time slot sequence for the mobile unit scheduled in advance by the time slot system, the mobile unit is arranged to permit direct message transmission to or from other unit(s) in the arrangement when it enters into or is covered by the first reception area, and in that in the case where the tuning of the mobile unit gives a sequence of the mobile unit's time slots that differs from the sequence scheduled in advance in the arrangement, that is the mobile unit's sequence is out of phase with the scheduled sequence, the mobile unit exchanges information with the said devices and from these obtains correction or displacement of its time slot sequence so that it conforms with the scheduled sequence.

6. An arrangement according to claim 5, characterized in that the first reception area is moved via the unit or units which are arranged to be fixed or mobile.

7. An arrangement according to claim 6, characterized in that the said reference time(s) emanate secondarily from master time generation which is arranged within a second reception area located inside the first reception area.

8. An arrangement according to claim 7, characterized in that a mobile unit that is located or ends up outside the first reception area (due to variation and/or movement of the first reception area and/or the mobile unit) obtains the reference time indication in the first reception area upon entry into the first reception area.

9. An arrangement according to claim 8, characterized in that updating and maintenance of accuracy of the reference time(s) of the first reception area are effected by one or more mobile units entering into or being covered by the second reception area at least temporarily for a predetermined minimum interval of time and thereby obtaining for other mobile units in the first reception area updated reference time(s) that is transformed.

10. An arrangement according to claim 9, characterized in that the system works with or comprises a radio system of the Bluetooth type which works with symmetrical slots with predetermined frequency, that the system jumps between a number of frequencies that respective mobile nodes incorporated in the system are pre-synchronized to the system by means of knowledge of an initial time (t), the algorithm for time slots for transmission and reception and for frequency jumping, and that as soon as it has entered into the fixed system the respective mobile node is synchronized only with the fixed network, which in turn is synchronized to the reference time system, that is the requirement that the mobile node is to be directly synchronized to the reference time system no longer applies.

11. An arrangement according to claim 10, characterized in that the mobile node is arranged to synchronize itself into the system as soon as it is able to synchronize itself to the time in the reference time system.

12. An arrangement according to claim 11, characterized in that respective mobile units first obtain or acquire the requisite protocol information before they enter into or are covered by the reception area in question.

13. An arrangement according to claim 12, characterized in that in the case where the reference time area is smaller than the network area, nodes concerned receive the requisite protocol information outside the reference time and network areas, that when it enters into or is covered by the network area the unit lacks the ability to synchronize itself to this, as it is not synchronized to the reference system, but the unit synchronizes itself to the reference time once it has entered into or is covered by the reference time area and when this has occurred the unit is arranged to calculated the correct frequencies and time slots and is able to connect itself to the network using other relevant protocol information and that when it is inside the network area the unit can thereafter leave the time reference area, as it is sufficient for the unit or units that are within the time reference area to be synchronized to the reference time.

14. An arrangement according to claim 13, characterized in that the units connected to the network that are outside the reference time area maintain the synchronization by using the time slots of the units synchronized to the reference time as secondary reference time indicators.

15. An arrangement according to claim 14, characterized in that at least any one unit in the network must enter the reference time area for re-synchronization before the time slots in the system fall outside acceptable tolerance levels.

16. An arrangement according to claim 15, characterized in that the system comprises or is based on advertising boards along one or more roads or sections of road along which vehicles or other mobile units move, that the advertising boards are arranged with radio units, the coverage areas of which are not overlapping, meaning that they can have or utilize the same frequency arrangement and time slots and can work in a synchronous way and that the respective coverage areas have access to the reference time system, which preferably consists of the GPS system.

17. An arrangement according to claim 16, characterized in that the vehicle which moves along the road or section of road is in contact with and is synchronized to the reference system, that when the vehicle passes the advertising boards, the vehicle receives messages from the advertising boards.

18. An arrangement according to claims 16 and 17, characterized in that the contact between the advertising boards and the vehicle is two way and that information from the vehicle is thus able to be transmitted to the advertising boards, that the coverage area for an advertising board consists of a predetermined distance along the road for effective contact with the car for a period of time if the vehicle is travelling in a range from 0 to 100 km/hour.

19. An arrangement according to claim 18, characterized in that the coverage areas of the advertising boards overlap each other and that the advertising boards interact in a shared network, which means that the time slots are divided between them, whereby only one unit needs to be synchronized to the reference time system and other units can synchronize on the time slots in the network.

20. An arrangement according to claim 19, characterized in that the system is arranged with parallel road lanes, where each lane has two sets of traffic lights, one at the entrance and one at the exit, that a sensor is arranged at the entrance and the exit to each lane, which sensor detects the passing of the respective vehicle, the respective lane is provided with a local wired network that is connected to a lane controller unit, to the traffic lights and to a number of radio units that are sequentially overlapped, which lane controller unit is in turn connected to a wired network, which is connected to a charging system via a road toll unit.

21. An arrangement according to claim 20, characterized in that if there is no vehicle/car in a lane, the entrance light shows green and the exit light shows red, that when a vehicle/car passes the sensor the entrance light changes to red, after which the vehicle/car passes the radio units that work in a synchronous way, that while the vehicle/car passes the respective radio units, requisite information is exchanged for the purpose of charging for the road toll, and that thereafter the exit light changes to red and when the vehicle/car has passed the exit sensor, the lane in question returns to its original status.

22. An arrangement according to claim 20 or 21, characterized in that the radio units working in a synchronous way obtain a redundant connection to the passing vehicle/car with good range in the longitudinal direction of the lane, but with a limited range in the transverse direction, where the propagation diagram in question is improved or optimized by the use of directional antennas.

23. An arrangement according to claim 22, characterized in that the radio units are grouped in order to minimize crosstalk and message packet collisions between the lanes, and/or that the time slots are coordinated so that crosstalk or message packet collisions are eliminated.

24. An arrangement according to claim 23, characterized in that the respective local networks (64, 65, 66) operate with a time slot system in which the schedules are phase-displaced in frequency (in a known way) in each time slot and the channel frequency thus obtained in the respective time slots is allocated to a particular category of at least one of customer or staff.

25. An arrangement according to claim 24, characterized in that a first channel frequency is allocated to the local network's customers and a second channel frequency is allocated to the local network's staff.

26. An arrangement according to claim 25, characterized in that a first channel frequency (71') is allocated to a first category of customer and a second channel frequency (72') is allocated to a second category of customer.

27. An arrangement according to claim 26, characterized in that the channel frequency in accordance with the utilized signal protocol jumps at random and at the same time in accordance with algorithms incorporated in the protocol.

28. An arrangement according to claim 27, characterized in that the local networks (64, 65, 66) are arranged at petrol stations and that the mobile units are allocated or belong to the stations' customers.

29. An arrangement according to claim 28, characterized in that the scheduling is distributed and that separation of different categories of at least one of customer or staff is carried out in time and/or frequency, and that the transmission in the radio apparatus (transmitter/receiver) concerned operates with directed transmissions in order that staff or customer apparatus in close proximity to other staff or customer apparatus will not be subject to interference.

30. An arrangement according to claim 29, characterized in that the error-detection function utilizes detection of the signal strength and in certain cases (a multipath situation), also utilizes error-detection code in the signal protocol, changing of the antenna propagation and/or antenna direction.

31. An arrangement according to claim 30, characterized in that, prior to entering into a local network, the respective mobile unit refers to a basic signal protocol system with regard to utilized schedule, jump algorithms, protocol, transmissions, transmission direction, etc, by means of which basic system the mobile unit makes contact with the respective local network for changing to corresponding current parameters that apply in the local network.

32. An arrangement according to claim 31, characterized in that the local network is arranged to operate with a function for approving the entering mobile customers.

33. An arrangement for establishing a common global time-keeping for a system, comprising:
mobile units pre-synchronized to a respective reference time area of respective local networks before entering the respective local networks and synchronized across at least two geographically separated local networks,
wherein each node incorporated in the system is allocated a local time that can either be the same as or related to a global time, that a schedule is drawn up for a number, preferably all, of the nodes in the system,
which schedule has time slots referring to the global time for transmission and reception of messages, and that the time slots are distributed to each node that are allocated the messages that the node is intended to transmit or receive in such a way that receivers and destinations(s) for the majority of all messages are determined only from knowledge of the system's schedule, the common global time keeping and the time slot in which the message is sent.

34. An arrangement according to claim 33, characterized in that each receiver determines whether a message is destined for it by the time slot in which the message is sent being allocated to that receiver for the reception of messages.

35. An arrangement according to claim 33 or 34, characterized in that messages that are received in time slots at other times than those covered by allocated time slots for reception are saved with information about the time slot or time of reception in order to re-send the message in the receiver's own transmission time slot, if so required.

36. An arrangement according to claim 33, 34 or 35, characterized in that the signal strength of messages that have the correct bit content according to the protocol's error-detection mechanisms, but which are received in time slots other than those allocated to the node, are saved with information about the time slot or time of reception and this information is used in order to optimize the system.

37. An arrangement according to any one of claims 33-36, characterized in that redundant information in the messages, for at least one of sender, recipient and message identity, is used to detect errors in the scheduling or implementation of the respective node's part of the schedule.

38. An arrangement comprising mobile units incorporated in a network system, characterized in that the mobile units are able to be connected to the network system by means of a time base that is common to the network system, comprising:
- mobile units pre-synchronized to a respective reference time area of respective local networks before entering the respective local networks and synchronized across at least two geographically separated local networks,
- wherein the time base lacks a geographical relationship to the network's radio coverage of the network system and emanates from an independent time generation source,
- wherein parts of a utilized network protocol necessary for radio communication between the units and associated time slots and frequencies are related to the time base by means of algorithms, that, for a given time, allows for the relevant frequency and time slot to be calculated.

39. An arrangement according to claim 38, characterized in that a virtual, geographically-independent network thereby exists, where all nodes that are intended to be incorporated are synchronized in advance to the network or the network system.

40. An arrangement according to claim 38 or 39, characterized in that a sub-network that is limited by the radio range of the mobile units incorporated in the sub-network is able to be established without, or with greatly simplified, hand-shaking procedures.

41. An arrangement according to claim 40, characterized in that time messages are to be found on a previously selected frequency.

42. An arrangement according to claim 41, characterized in that the frequency is fixed and that the time message, in addition to comprising the actual time, also contains information or data that identifies the system and that a mobile unit not connected to the system at the time in question is able to synchronize itself to the network on the messages that are due to be sent in order to maintain a global time in the system.

43. An arrangement according to 42, characterized in that the fixed network system in question is situated on a vehicle/car and that fixed and/or mobile nodes are able to be covered by the vehicle/car's network.

44. An arrangement with a number of mobile units which can communicate with each other via a wireless connection system for the transmission of messages with control information data (commands) and/or process data where the connection system works with a first reception area and a time slot system comprising:
- mobile units pre-synchronized to a respective reference time area of respective local networks before entering the respective local networks and synchronized across at least two geographically separated local networks;
- wherein the time slot system, the units have access to the relevant transmission media in allocated and sequential time intervals, in which intervals the units are activated for their transmissions or receptions by means of time information executed in the time slot system, referring to one or more reference times utilized in the time slot system, characterized in that the said reference time(s) emanate secondarily from master time generation that is arranged within a second reception area located inside the first reception area, that a mobile unit that is located or ends up outside the first reception area due to variation and/or movement of the first reception area and/or movement of the unit, obtains reference time indication when the unit is covered by the first reception area or enters into the first reception area, and that updating and maintaining of the accuracy of the first area's reference time(s) is effected by one or more mobile units entering, being covered by or being located in the second reception area at least temporarily for a predetermined minimum interval of time, and obtaining for other mobile units in the first reception area updated reference time(s) that is transformed.

* * * * *